(12) United States Patent
Wang et al.

(10) Patent No.: US 7,715,480 B2
(45) Date of Patent: May 11, 2010

(54) VIDEO ENCODING WITH MOTION-SELECTIVE WAVELET TRANSFORM

(75) Inventors: Beibei Wang, Brooklyn, NY (US); Anthony Vetro, Cambridge, MA (US); Yao Wang, Matawan, NJ (US)

(73) Assignee: Mitsubishi Electric Research Laboratories, Inc., Camebridge, MA (US)

( * ) Notice: Subject to any disclaimer, the term of this patent is extended or adjusted under 35 U.S.C. 154(b) by 1951 days.

(21) Appl. No.: 10/688,133

(22) Filed: Oct. 17, 2003

(65) Prior Publication Data

US 2005/0084014 A1      Apr. 21, 2005

(51) Int. Cl.
*H04N 7/12* (2006.01)
(52) U.S. Cl. .................................. 375/240.19
(58) Field of Classification Search ............ 375/240.19, 375/240.2
See application file for complete search history.

(56) References Cited

U.S. PATENT DOCUMENTS

| | | | | |
|---|---|---|---|---|
| 6,137,915 | A * | 10/2000 | Chai | 382/240 |
| 6,477,280 | B1 * | 11/2002 | Malvar | 382/245 |
| 6,664,913 | B1 * | 12/2003 | Craven et al. | 341/200 |
| 6,898,324 | B2 * | 5/2005 | Pesquet-Popescu | 382/240 |
| 6,956,903 | B2 * | 10/2005 | Acharya et al. | 375/240.19 |

OTHER PUBLICATIONS

'A matching pursuit enhanced three-dimensional wavelet transform coder' to Marusic Bostjan, Electrotechnical Conference, 2000. MELECON 2000. 10th Mediterranean, vol. 2, On pp. 482-485 vol. 2, Pub. 2000.*

'A Uniform Transform Domain Video Codec Based on Dual Tree Complex Wavelet Transform' to Sivaramakrishnan, Pub. 2001, IEEE.*

Antonini, et al. in "Image coding using the wavelet transform," IEEE Trans. Image Processing, Apr. 1992.

Le Gall et al., in "Subband coding of digital images using symmetric short kernel filters and arithmetic coding techniques," Proc. IEEE Int'l Conf. Acoustics, Speech and Signal Processing, 1988.

Kim et al., in "Low Bit-Rate Scalable Video Coding with 3D Set Partitioning in Hierarchical Trees (3D SPIHT)," IEEE Trans. Circuits and Systems for Video Technology, Dec. 2000.

Hsiang, et al., in "Embedded video coding using invertible motion compensated 3D subband/wavelet filter bank," Proc. Packet Video Workshop, Sardinia, Italy, May 2000.

Kingsbury, "Complex wavelets for shift invariant analysis and filtering of signals," Journal of Applied and Computational Harmonic Analysis, May 2001.

Kingsbury et al. in "Redundant Representation with Complex Wavelets: How to achieve sparsity?," Proc. IEEE Int'l Conference on Image Processing, 2003.

Selesnick, "The Design of Approximate Hilbert Transform Pairs of Wavelet Bases," IEEE Transactions on Signal Processing, vol. 50, No. 5, May 2002.

Selesnick et al., "Video Denoising Using 2D and 3D Dual-Tree Complex Wavelet Transforms," Polytechnic University, Brooklyn, NY, May, 2001.

* cited by examiner

*Primary Examiner*—David Czekaj
(74) *Attorney, Agent, or Firm*—Dirk Brinkman; Gene Vinokur

(57) ABSTRACT

A method encodes a video by applying a dual-tree discrete wavelet transform to the video to generate sequences of wavelet coefficients. The sequences are compressed to produce a compressed bitstream corresponding to the video. The compression iteratively selects the wavelet coefficients in a large to small order, and entropy encodes the selected wavelet coefficient.

14 Claims, 8 Drawing Sheets

# VIDEO ENCODING WITH MOTION-SELECTIVE WAVELET TRANSFORM

FIELD OF THE INVENTION

The invention relates generally to encoding of video, and more particularly to encoding a video based on a motion selective wavelet transform.

BACKGROUND OF THE INVENTION

A discrete wavelet transform (DWT) provides a multi-resolution representation of a signal. The DWT can be used for a variety of applications such as denoising, restoration and enhancement. The DWT can also be used for compression, particularly the compression of video signals. The DWT for video compression achieves high compression efficiency, and also enable a scalable representation of the video in spatial resolution, temporal resolution and quality, i.e., signal-to-noise ratio (SNR).

One of the most successful applications of the DWT for image compression is the JPEG 2000 compression standard, see "ISO/IEC 15444-1:2000: Information technology—JPEG 2000 Image Coding System—Part 1: Core Coding System," 2000.

As shown in FIG. 1, the encoding system includes a forward DWT 110, a quantization encoder 120, and an entropy encoder 130 to compress an input image 101 into an output bitstream 102. These operations are performed in reverse in a decoder. This image encoding system achieves both spatial and SNR scalability.

According to the JPEG 2000 standard, the transform can be irreversible or reversible. The default irreversible filter is a Daubechies 9/7 filter described by Antonini, et al. in "Image coding using the wavelet transform," IEEE Trans. Image Processing," April 1992, while the default reversible filter is a Le Gall 5/3 filter described by Le Gall et al., in "Subband coding of digital images using symmetric short kernel filters and arithmetic coding techniques," Proc. IEEE Int'l Conf. Acoustics, Speech and Signal Processing, 1988.

During encoding, an image is decomposed into rectangular tiles, where each tile-component is a basic unit of the original or reconstructed image. The DWT is applied to each tile, and the tile is decomposed into multiple resolution levels. The resolution levels are made up of subbands of coefficients that describe the frequency characteristics of the tile components. The subband coefficients are quantized and collected into rectangular arrays of code blocks, which are then entropy coded with a bit plane coding technique.

For video compression, there exists several codecs that use the DWT. The prior art codecs can be classified into two distinct categories: a first that is strictly transform-based and does not use any motion compensation techniques, and a second that attempts to exploit temporal redundancy in the video using motion compensation. Both methods are scalable in both the spatial and temporal domains, as well as SNR scalable.

An example of the transform-based wavelet video codec is described by Kim et al., in "Low Bit-Rate Scalable Video Coding with 3D Set Partitioning in Hierarchical Trees (3D SPIHT)," IEEE Trans. Circuits and Systems for Video Technology, December 2000. That method is referred to as 3D-SPIHT and applies a separable 1D wavelet transform in each dimension to obtain the 3D subband decomposition. That encoding technique has the following properties: (1) partially ordering of the magnitudes of the 3D wavelet-transformed video with a 3D set partitioning algorithm, (2) ordering of the bit-planes of refinement bits for transmission, and (3) exploiting self-similarity across spatio-temporal orientation trees.

While the 3D-SPIHT codec is free from the computational burden of motion compensation, it has a fundamental problem in that different orientations are mixed. To explain this mixing problem, consider applying the DWT to a 2D signal such as an image, where we apply the 1D transform in both the horizontal and vertical directions. There are three wavelets associated with this 2D transform.

FIGS. 2A-2C show respectively their impulse responses. The wavelet in FIG. 2C does not have a dominant direction. This checkerboard artifact indicates that the 2D DWT is poor at isolating diagonal orientations.

For 3D signals such as video, this problem becomes much worse because the third dimension is time, and the mixing of different motion orientations is a much more severe issue that leads to significant inefficiencies for coding.

An example of a motion compensating wavelet video codec is described by Hsiang et al., in "Embedded video coding using invertible motion compensated 3-D subband/wavelet filter bank," Signal Processing: Image Communications, May 2001. That method is referred to as MC-EZBC, which stands for motion compensation with embedded zero-tree block coding.

FIG. 3 shows a block diagram of that codec. An input video is first subject to a motion compensated temporal filter (MCTF) 310 that filters the video in the temporal direction using motion vectors computed by a motion estimation unit 320. The filter 310 is half-pixel accurate with perfect reconstruction, which allows for higher coding gains compared to the full-pixel temporal filters.

The output of the MCTF is subject to a spatial analysis 330 to complete the 3D decomposition. The resulting 3D subband coefficients are entropy encoded 340. The motion vectors are also entropy coded by a MV encoder 350, which utilizes traditional prediction and entropy coding techniques. The output of the encoders 340 and 350 can be buffered 360 before an output bitstream 302 is produced.

Because the above codec performs motion estimation locally at the block level and applies the temporal filtering accordingly, the problem of mixing different motion orientations is less of an issue than in the 3D-SPIHT codec. However, a 2D spatial analysis filter is still used. Therefore this codec is still susceptible to the mixing of spatial orientations. Regardless of the mixed orientations problem, the major drawback of this codec is the computational requirements for motion compensation, which is performed locally at the block level.

Given the above prior art in this area, there exists the need for a wavelet-based video codec that avoids the problem of conventional multi-dimensional DWT that mixes different orientations and also avoids the need for motion estimation.

SUMMARY OF THE INVENTION

The invention provides a 3D motion selective wavelet transform. A 3D dual-tree discrete wavelet transform, is applied to a video for video encoding. The video codec according to the invention is free of mixing 3D orientations, and does not require motion estimation and motion compensation.

The dual-tree DWT is an over-complete transform in that it increases the number of coefficients to be coded. An input video is decomposed into four wavelet coefficient sequences. Iterative selection methods are used to reduce the number of overcomplete coefficients. To code video efficiently, processes that exploit correlation across and within the four coefficient sequences is exploited, including prediction and entropy coding.

DETAILED DESCRIPTION OF THE PREFERRED EMBODIMENT

Our invention is a video codec that is based on a dual-tree discrete wavelet transform. As an advantage over the prior art, our codec does not require motion estimation. In addition, our codec does not mix different orientations in the video.

As described in further detail below, the dual-tree DWT is an overcomplete transform, i.e., it increases the number of coefficients to be coded. However, this expansion of data is overcome by the fact that a more meaningful decomposition of the video is obtained, i.e., the transform is motion-selective, and that the resulting coefficients exhibit strong correlation.

The coding of the dual-tree DWT coefficients comprises three processes: iterative selection, prediction and entropy coding.

The iterative selection is a type of pre-processing stage to reduce the number of the overcomplete coefficients.

Prediction is used to reduce the energy in the subbands by exploiting correlation across different subbands. This is different than prior art prediction technique because we operate on the overcomplete set of coefficients produced by the dual-tree DWT.

The entropy coding stage employs novel context models that are designed to exploit a strong correlation across subbands produced by the dual-tree DWT.

Dual-Tree Discrete Wavelet Transform

The dual-tree DWT is described by Kingsbury in "Complex wavelets for shift invariant analysis and filtering of signals," Journal of Applied and Computational Harmonic Analysis, May 2001. The primary advantage of the dual-tree DWT is that it can be used to implement multi-dimensional wavelet transforms that are more selective with respect to orientation. This property is referred to as directional selectivity.

A process for constructing Hilbert pairs of short orthonormal and bi-orthogonal wavelet bases is described by Selesnick in, "The design of approximate Hilbert transform pairs of wavelet bases," IEEE Trans. on Signal Processing, May 2002. That construction yields pairs of bases that can implement the motion-selective wavelet transform according to our invention. The design and motion-selectivity of the 3D dual-tree complex wavelet transform for video denoising is described by Selesnick in "Video denoising using 2D and 3D dual-tree complex wavelet transforms," Proc. SPIE 5207: Wavelet Applications in Signal and Image Processing, August 2003.

Figure 1:
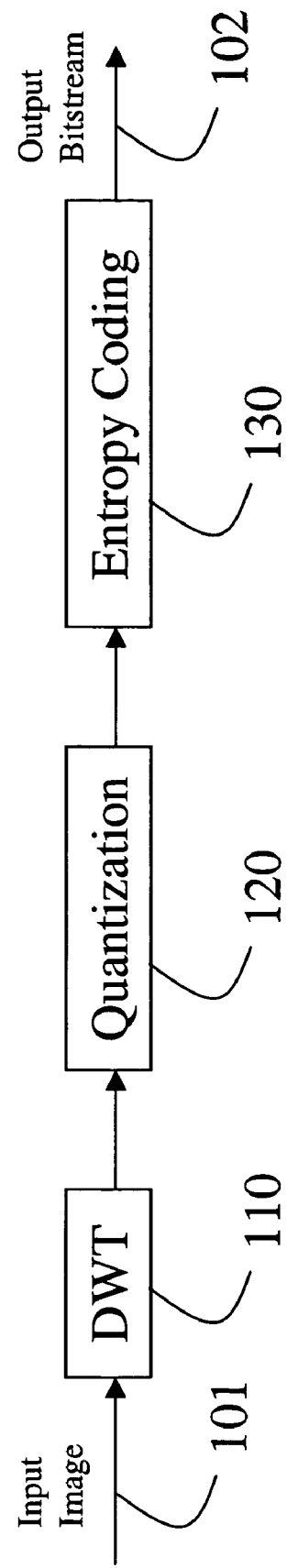
FIG. 1 is a block diagram of a prior art encoding system for images using a discrete wavelet transform.
Figure 2:
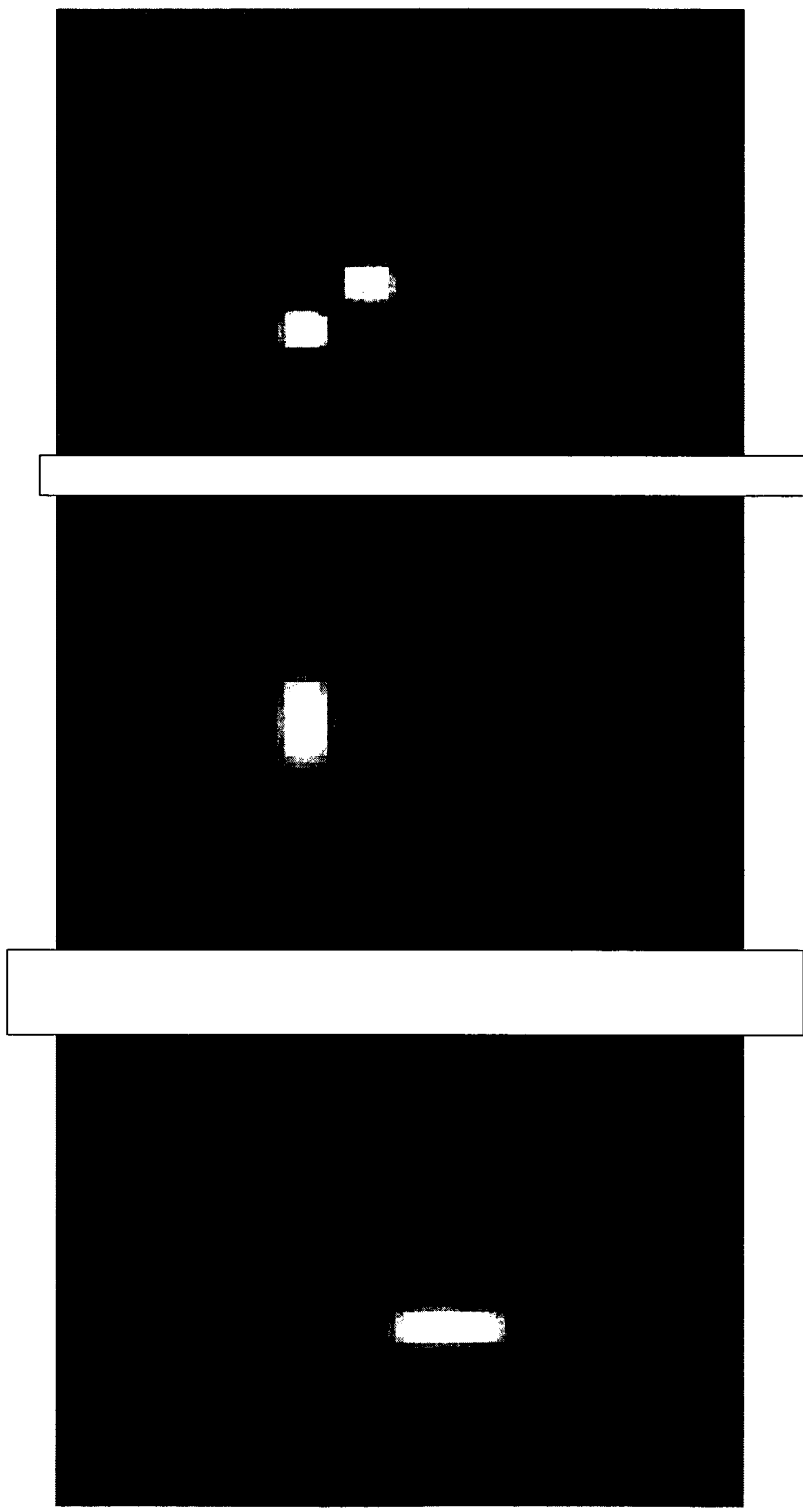
FIGS. 2A-2C are images of impulse responses of a 2D discrete wavelet transform.
Figure 3:
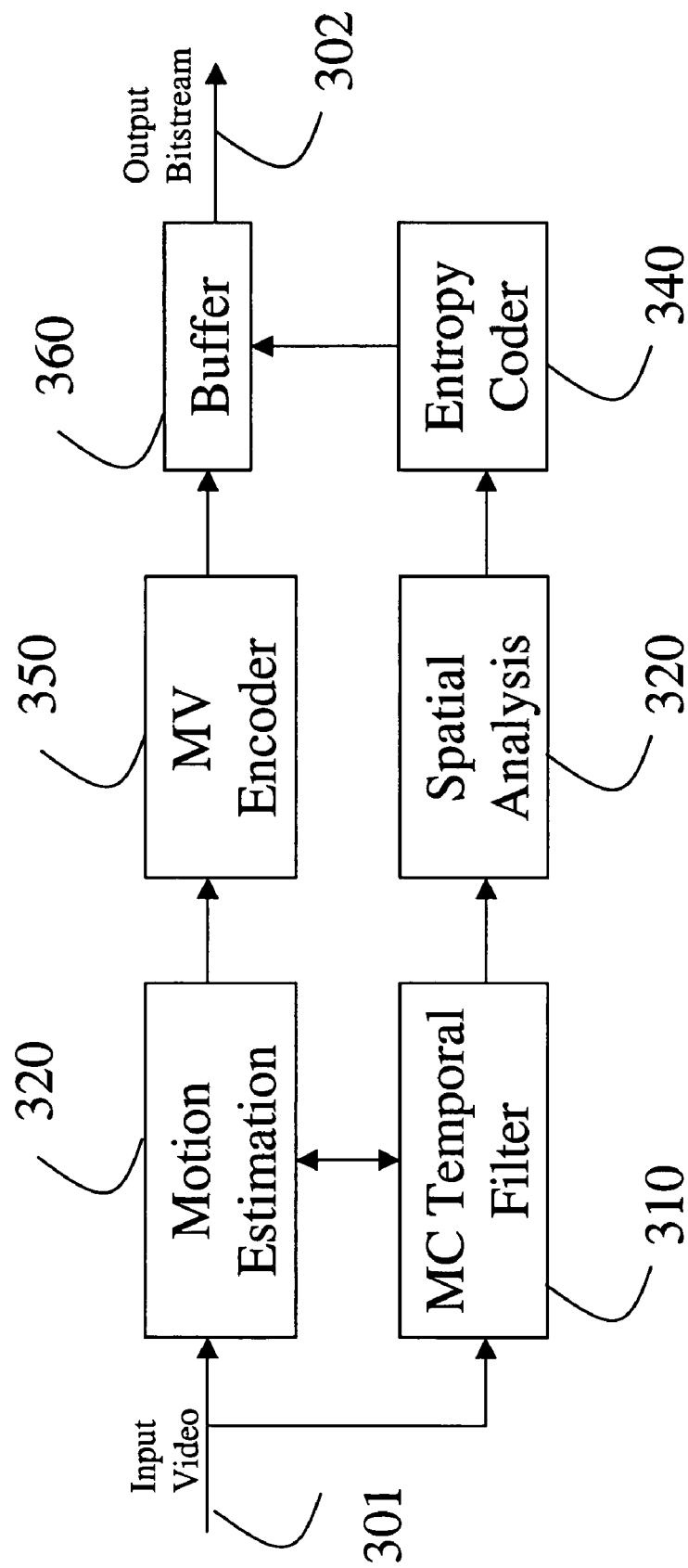
FIG. 3 is a block diagram of a prior art encoding system for videos using a discrete wavelet transform.
Figure 4:
FIG. 4 is an image of an impulse response of a 2D dual-tree discrete wavelet transform according to the invention.

To illustrate the directional selectivity property, consider the impulse responses shown in FIG. 4 for the 2D dual-tree DWT. We can see that the 2D dual-tree DWT provides six directionally selective filters. It is important to note that there is a distinct dominant direction for each of these six filters. This results in a more meaningful decomposition that is free of mixed orientations.

The directional selectivity property generalizes to higher dimensions, such that an m-dimensional dual-tree DWT produces $(4^m-2^m)/2$ directionally selective filters. For example, a 3D dual-tree DWT yields a total of 28 distinct directionally selective filters. For video, time is one of the dimensions. Hence, the filters can be considered as being motion selective.

It is also important to note that the m-dimensional dual-tree DWT is a complex transform, with real and imaginary parts. As a result, data expand by a factor of $2^m$. In our invention, we apply the transform in 3D, so the redundancy is 8:1. However, by only considering the real part of the complex coefficients, the redundancy is 4:1.

Figure 5:
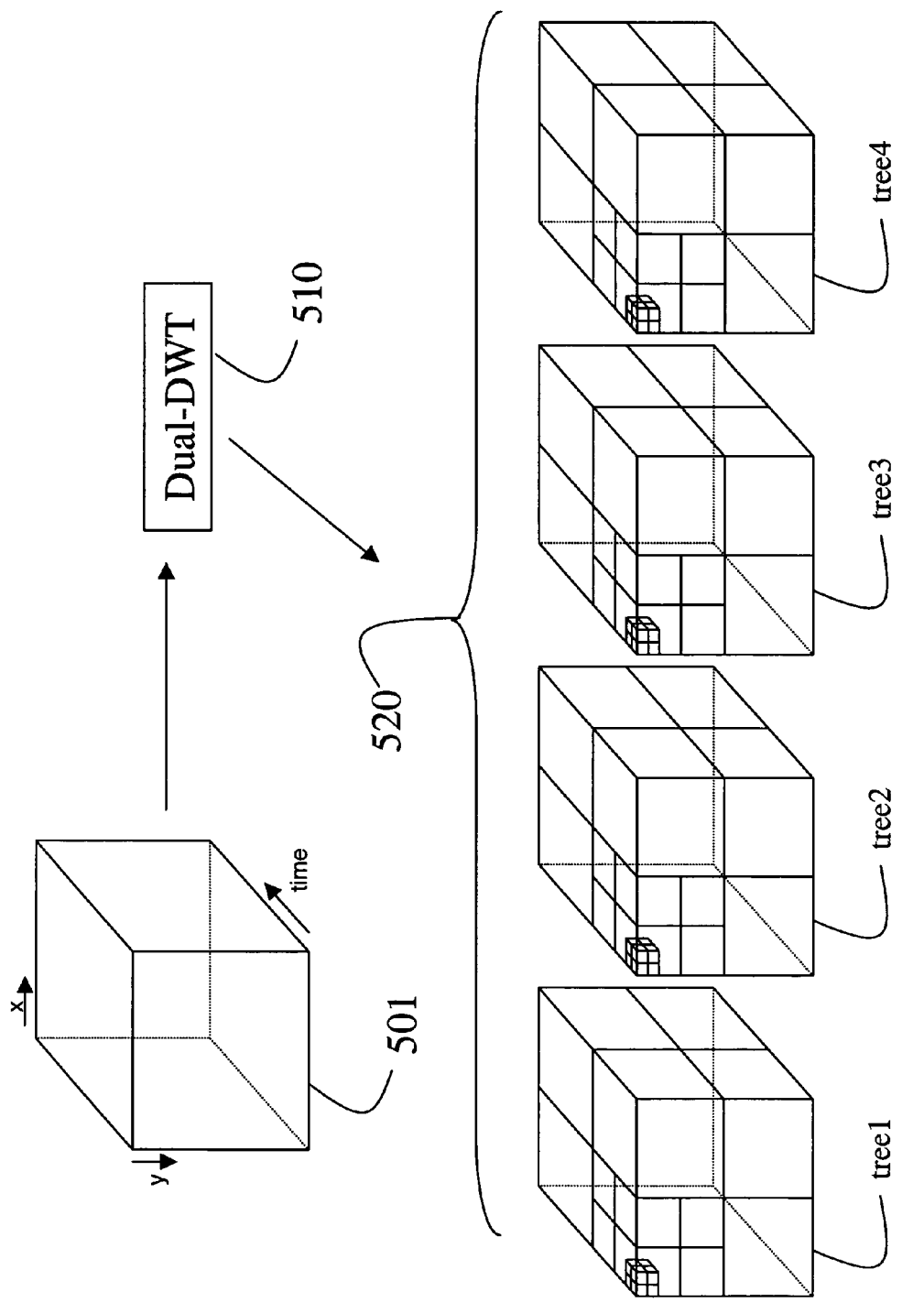
FIG. 5 is a block diagram of a subband decomposition of a video transformed by a 3D dual-tree DWT.

As shown in FIG. 5, the 3D dual-tree DWT gives a meaningful multi-scale decomposition for a video 501. Through the dual-tree DWT 510, the input video sequence is decomposed into four correlated wavelet coefficient sequences 420, denoted as tree1-tree4.

There is a strong correlation within each tree along the temporal direction referred to as temporal correlation. Furthermore, at a given instant in time, there is also strong correlation among the four trees. This is referred to as spatial correlation. To code a video efficiently, both the temporal and spatial correlations in the dual-tree DWT coefficient sequences are exploited.

System Overview

Figure 6:
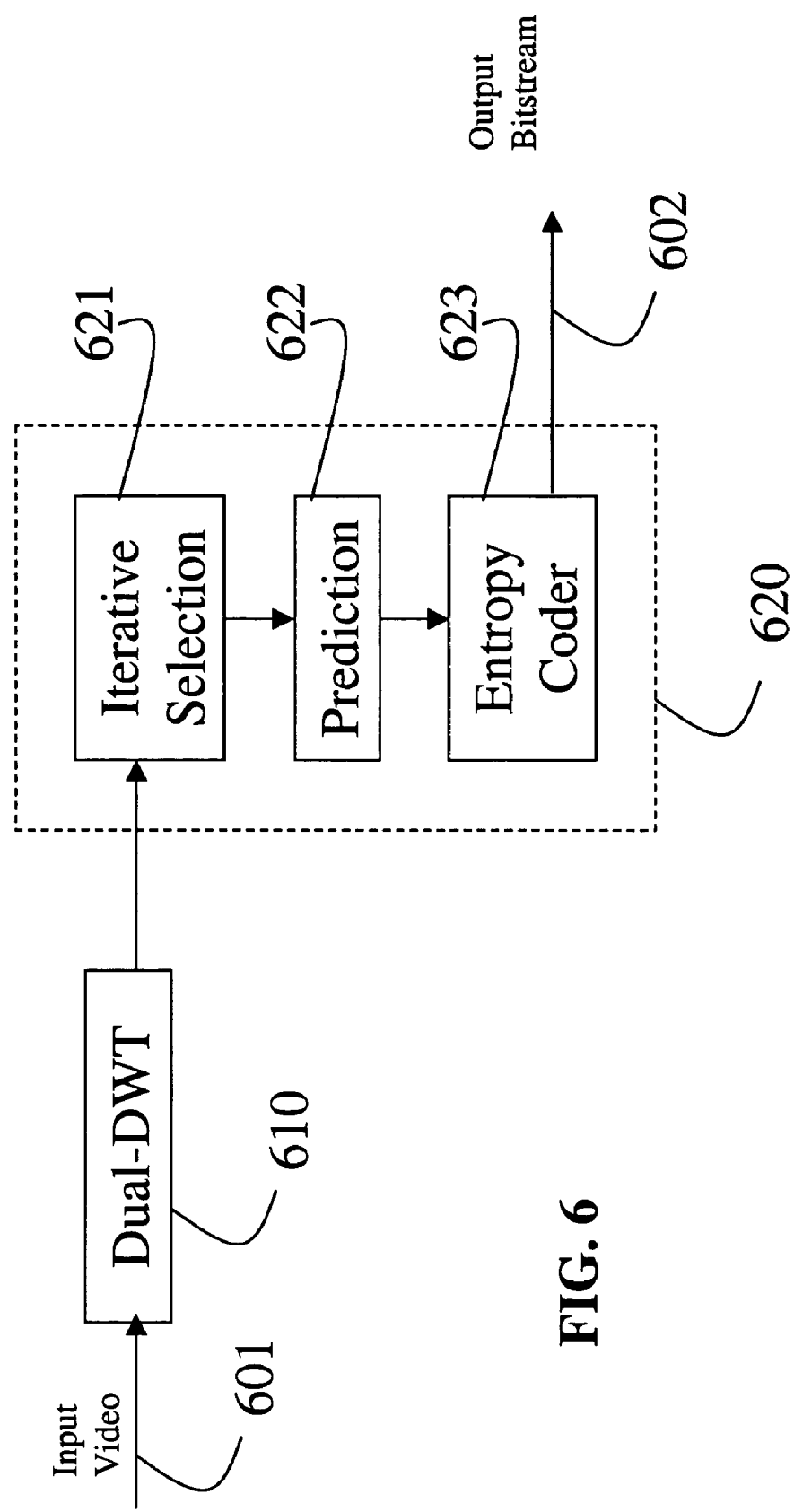
FIG. 6 is a block diagram of an encoding system for videos using a motion-selective wavelet transform according to the invention.

FIG. 6 shows a video codec system 600 according to the invention. An input video 601 is first subject to the 3D dual-tree DWT 610. The resulting subband coefficient data are then passed to a compression engine 620. The compression engine is comprised of three components: iterative selection 621, prediction 622, and entropy encoding 623. After entropy coding, an output bitstream 602 is produced.

The methods associated with each of the components in the compression engine are described in detail below.

It is noted that not all components need to be employed in the compression stage 620. For instance, the prediction 622 can be skipped when the entropy coding stage 623 exploits the correlation between the four trees. The iterative selective process 621 can also be skipped to reduce complexity, but at the expense of coding efficiency. Also, different types of entropy encoding techniques can be used, such as conventional arithmetic encoding or content-adaptive arithmetic coding. Consequently, there are various different configurations of the described methods that can compress the coefficient sequences resulting from the 3D dual-tree DWT.

Iterative Selection

The iterative selection 621 determines the most significant coefficients to encode. In the following, we describe two iterative selection methods: noise shaping and matching pursuits.

The basic idea of noise shaping is to modify large coefficients to compensate for the loss of small coefficients, without substantially changing underlying video content.

Figure 7:
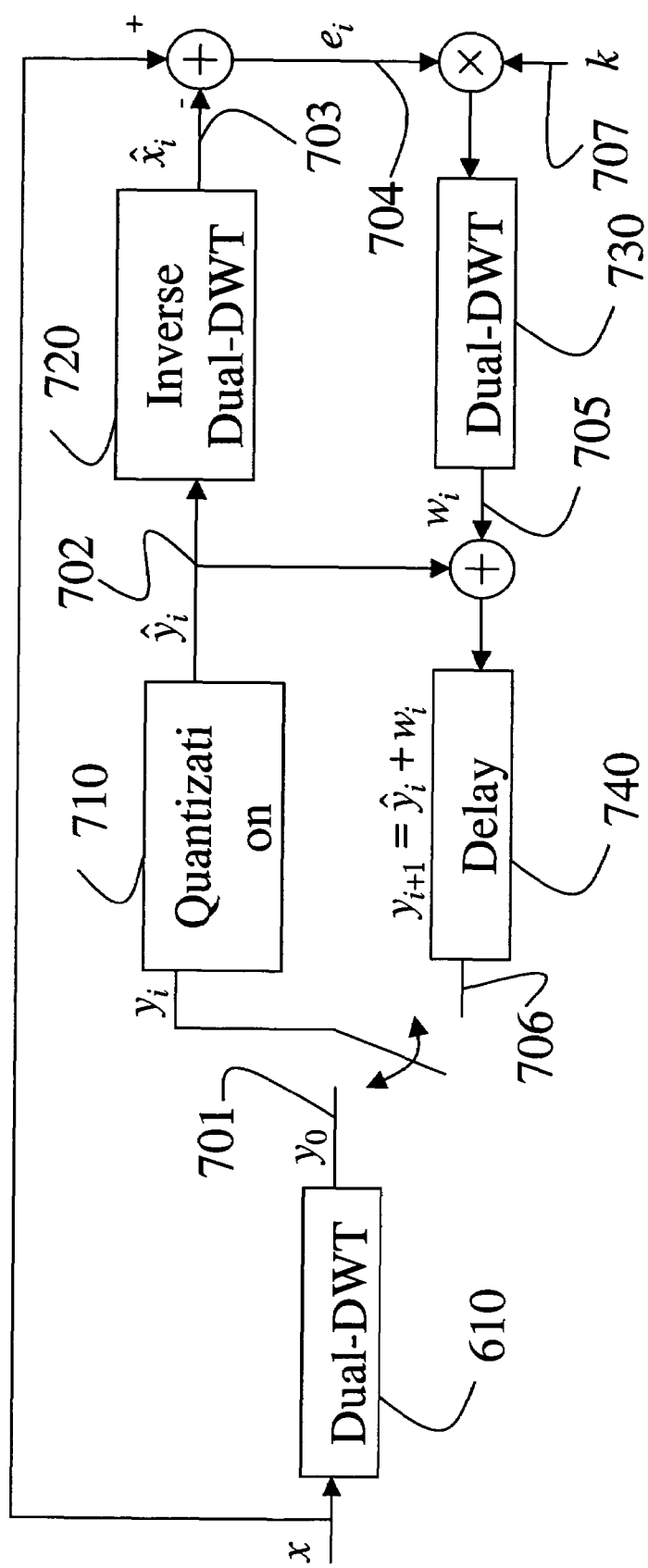
FIG. 7 is a block diagram of an iterative selection method according to the invention.

FIG. 7 shows a noise shaping method described by Kingsbury et al. in "Redundant Representation with Complex Wavelets: How to achieve sparsity?," Proc. IEEE Int'l Conference on Image Processing, 2003. The incoming video is denoted by x. In the first iteration, after the dual-tree DWT 610, the coefficients $y_0$ 701 are quantized 710. Then, the quantized coefficients, $\hat{y}_0$ 702, are transformed 720 back into the video domain to obtain a quantized video, $\hat{x}_0$ 703. An error 704 between the original and quantized video is $e_0 = x_0 - \hat{x}_0$. This error signal is then transformed back 730 into the wavelet domain and denoted by $w_0$. Then, the reconstructed video 706 is $y_1 = \hat{y}_0 + w_0$, after a delay 740. The above process is repeated until a target number of coefficients are obtained. Within the loop, a multiplier k 707 is applied to the error signal to compensate for losses in the error signal resulting from the projection process. For stable convergence, a value in the range [0,2] is used.

Matching pursuit is another type of iterative selection method. It is a greedy algorithm that reduces iteratively the error in the residual signal. At each iteration, only the largest coefficient is selected. The error signal is expanded in the same way as the original signal until a complete set of significant coefficients is generated.

Because both noise shaping and matching pursuit select significant coefficients iteratively, the two methods can be combined. The combined algorithm modifies the large coefficients according to the noise shaping method, and each time selects only one largest coefficient according to the matching pursuit method.

Iterative selection techniques such as noise shaping and matching pursuits are an effective means to select significant coefficients. After noise shaping, the number of coefficients that need to be coded code is significantly reduced with minimal impact on the content of the video. As a result, improved compression efficiency is obtained.

Prediction

Because the four dual-tree DWT trees have strong correlations, it is reasonable to consider using one tree to predict 622 another one. After dual-tree DWT decomposition, most of the energy of the video is contained in the low subbands of four trees, and the correlation among those four low subbands are much stronger than that found in the high subbands.

Prediction of low subbands can improve compression efficiency, while predicting the high subbands does not yield as much gain.

In one embodiment, prediction 622 is performed using the low subband of one dual-tree DWT tree to predict the low subbands of the other three trees. The error resulting from the prediction is encoded. The correlations between the pairs of tree1 and tree4, and tree2 and tree3 are strong, so we can use tree1 and tree2 as two references to predict tree4 and tree3, respectively.

In another embodiment, the correlation among all the four trees is exploited. We use tree1 to predict tree2, then use tree1 and tree2 together to predict tree3. Finally, tree1, tree2 and tree3 are all used to predict tree4. While this method is slightly more complex and introduces an increased dependency across the trees, improved coding gain is achieved.

In yet another embodiment, prediction is not employed.

Entropy Coding

Context-based arithmetic coding is an effective tool to exploit the statistical redundancy within a signal and is the fundamental coding technique that is adopted in our invention.

The basic idea of this entropy coding technique is to observe neighboring data values, and then based on the observed values, a probability that a current data value is a given value is assigned. A sequence of probabilities is then used to drive an arithmetic encoder. Higher probabilities yield a more efficient encoding of the data.

The observed values are referred to as the context. Given the subband coefficient data produced by the dual-tree DWT, we are faced with the problem of efficiently coding the expanded set of subband coefficients.

The dual-tree DWT coefficients are encoded bitplane by bitplane. First, the most significant bits and sign bits of the largest wavelet coefficients are encoded. Then, progressively the large coefficients are refined. Then, smaller coefficients are encoded in each iteration.

Our experiments show that the degree of correlation within each dual-tree is approximately equal to the degree of correlation across different dual-trees. Based on this observation, we construct a context model that observes data within the dual-tree DWT tree, as well as in different dual-trees.

Figure 8:
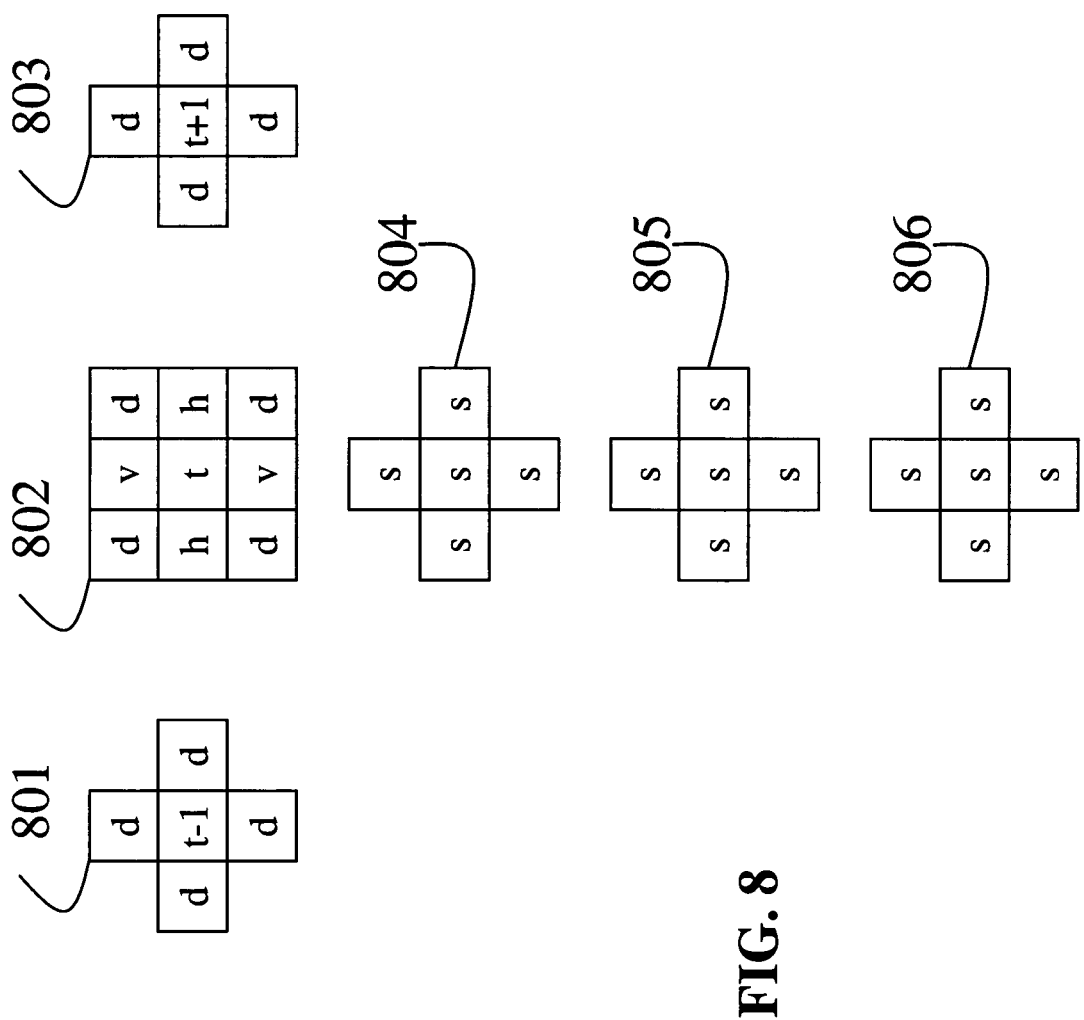
FIG. 8 is a block diagram of a context model used for a coder that spans both spatial and temporal directions.

FIG. 8 shows the preferred context model for coding the significance map of subband coefficients. In this context model, five types of neighbors are consider: horizontal neighbors denoted by h ($0 \leq \Sigma h \leq 2$), vertical neighbors denoted by v ($0 \leq \Sigma v \leq 2$), diagonal neighbors denoted by d ($0 \leq \Sigma d \leq 12$), immediate temporal neighbors denoted by t ($0 \leq \Sigma t \leq 2$), and spatial neighbors in other trees denoted by s ($0 \leq \Sigma s \leq 15$).

Context templates 801-803 are applied within a single tree, e.g., tree1, to account for the temporal redundancy within the coefficient sequence, while context 804-806 are applied to the three other remaining trees to account for the spatial redundancy across the coefficient sequences. Although there are many possible contexts associated with this model, $2^{33}$ to be exact, we discard context patterns that occur with a very low probability. In this way, the size of the probability table is significantly reduced. In the rare event that a discarded context is observed, we replace it with the nearest context in the table.

To code the sign of subband coefficients, a simpler context model can be used, e.g., one that accounts only for the immediate horizontal, vertical and temporal neighbors within a given dual-tree DWT tree.

It is noted that in place of the above context-based arithmetic encoding, arithmetic encoding that is not context-based can also be used.

Multiple Description Coding

The basic idea of multiple description coding, as described in detail below, is to generate two or more correlated bitstreams so that a high-quality reconstruction can be obtained from a combination of all of the bit streams, while a lower, but still acceptable, quality reconstruction is guaranteed if only one bit stream is received.

In a lossy network environment, packets containing compressed bits can be lost, either randomly or in bursts. With standard video coding techniques, either block-based or wavelet-based, a lost packet can lead to many subsequently received packets being undecodable, which in turn leads to noticeable visual artifacts.

With multiple description coding, as long as packets corresponding to one description are received for the same spatial-temporal region, then a certain quality is guaranteed. For this reason, multiple description coding is an effective method to combat transmission errors, especially in applications where retransmission of lost packets are not acceptable.

When a video is coded using the dual-tree DWT according to the invention, the four DWT trees have very strong correlations, and one tree can be estimated fairly well from the other trees based on this correlation.

In one embodiment, the multiple descriptions are generated by coding each tree independently, i.e., each tree is one description. The coding of each tree is achieved with a wavelet-based video coder.

At the receiver, if some descriptions are lost, then the lost descriptions are estimated based on the received descriptions. The drawback of this approach is that a significantly larger number of bits are required than if the four trees are coded together by exploiting the correlation among the trees. However, the redundancy improves error resilience.

More sophisticated coding methods reduce the redundancy, while still maintaining a desired degree of error resilience. In another embodiment, we code two trees into one description by exploiting the correlation between the two trees. If only one description is received, then the two trees in the lost description are estimated from the two trees in the received description based on the correlation between these trees.

For the estimation, we use a linear estimator, however non-linear estimators such as a minimal mean squares error estimator can also be used. With the linear estimator, a missing coefficient in one tree is estimated by a linear combination of the corresponding coefficients in the received trees. The prediction coefficients are based on a he correlation between corresponding coefficients in different trees, which can be measured from the received data.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for encoding a video, comprising an encoder system for performing steps of the method, comprising the steps of:
   applying a three dimensional dual-tree discrete wavelet transform to the video to generate a plurality of three dimensional sequences of wavelet coefficients having spatial and temporal correlation; and
   compressing the plurality of three dimensional sequences to produce a compressed bitstream corresponding to the video, and in which the compressing further comprises:
   selecting iteratively the wavelet coefficients in a large to small order, in which the selecting is a noise shaping method; and
   entropy encoding the selected wavelet coefficient; and in which the noise shaping method further comprises:
   quantizing the wavelet coefficients to produce quantized wavelet coefficients;
   inverse transforming the quantized wavelet coefficient to a quantized video;
   determining an error signal between the video and the quantized video;
   applying the three dimensional dual-tree discrete wavelet transform to the error signal; and
   adding the transformed error signal, after a delay, to the quantized wavelet coefficients.

2. The method of claim 1, further comprising:
   predicting a subset of the wavelet coefficients of the three dimensional sequences.

3. The method of claim 2, in which the predicted subset of the wavelet coefficients are in low energy subbands.

4. The method of claim 1, in which there are four sequences.

5. The method of claim 1, in which the entropy encoding is arithmetic encoding.

6. The method of claim 1, in which the entropy encoding is content-adaptive arithmetic coding.

7. The method of claim 1, in which the noise shaping method modifies large wavelet coefficients to compensate for a loss of small wavelet coefficients, without substantially changing content of the video.

8. The method of claim 1, in which the selecting uses a matching pursuit method.

9. The method of claim 8, in which the matching pursuit method iteratively selects the wavelet coefficients in a large to small order.

10. The method of claim 1, in which the sequences are encoded bitplane by bitplane in a most significant bit to least significant bit order.

11. The method of claim 1, in which the compressed bitstream is expressed as multiple descriptions.

12. The method of claim 11, in which the plurality of three dimensional sequences are coded independently to produce the multiple descriptions.

13. The method of claim 11, in which subsets of the wavelet coefficient are coded to produce the multiple descriptions.

14. The method of claim 11, further comprising:
   estimating, in a receiver, lost descriptions from a subset of the multiple descriptions received.

* * * * *